US011862417B2

(12) United States Patent
Yamamura et al.

(10) Patent No.: US 11,862,417 B2
(45) Date of Patent: Jan. 2, 2024

(54) VACUUM INTERRUPTER

(71) Applicants: MEIDENSHA CORPORATION, Tokyo (JP); SECHERON SA, Satigny (CH)

(72) Inventors: Kenta Yamamura, Numazu (JP); Takaaki Furuhata, Shizuoka (JP); Hideki Komatsu, Shizuoka (JP); Kosuke Hasegawa, Numazu (JP); Tetsuya Kanno, Numazu (JP); Bjorn Fischer, Gilly (CH); Tarek Lamara, Confignon (CH); Claudio Tricarico, Nyon (CH)

(73) Assignees: MEIDENSHA CORPORATION, Tokyo (JP); SECHERON SA, Satigny (CH)

( * ) Notice: Subject to any disclaimer, the term of this patent is extended or adjusted under 35 U.S.C. 154(b) by 182 days.

(21) Appl. No.: 17/428,434

(22) PCT Filed: Feb. 6, 2019

(86) PCT No.: PCT/JP2019/004156

§ 371 (c)(1),
(2) Date: Aug. 4, 2021

(87) PCT Pub. No.: WO2020/161810

PCT Pub. Date: Aug. 13, 2020

(65) Prior Publication Data

US 2022/0108854 A1 Apr. 7, 2022

(51) Int. Cl.
*H01H 33/662* (2006.01)
*H01H 33/664* (2006.01)

(52) U.S. Cl.
CPC ........ *H01H 33/662* (2013.01); *H01H 33/664* (2013.01)

(58) Field of Classification Search
CPC ............... H01H 33/662; H01H 33/664; H01H 33/66261; H01H 33/66207;
(Continued)

(56) References Cited

U.S. PATENT DOCUMENTS

| | | | | |
|---|---|---|---|---|
| 6,930,270 B2 * | 8/2005 | Fieberg | ............ | H01H 33/66207 218/68 |
| 7,205,499 B2 * | 4/2007 | Masnada | .......... | H01H 33/66261 218/136 |

(Continued)

FOREIGN PATENT DOCUMENTS

| | | |
|---|---|---|
| JP | 2010-282923 A | 12/2010 |
| JP | 6220911 B2 | 10/2017 |

OTHER PUBLICATIONS

Extended European Search Report, European Application No. 19914221.7, dated Jul. 22, 2022.

*Primary Examiner* — William A Bolton
(74) *Attorney, Agent, or Firm* — Foley & Lardner LLP

(57) ABSTRACT

A vacuum interrupter is equipped with a vacuum container and fixed and movable electrodes provided in the vacuum container. The vacuum container is constructed by hermetically respectively joining fixed-side and movable-side end plates to one and the other end portions of an insulating tube. The insulating tube is equipped at its end portion with a projection portion that projects in an axial direction of the insulating tube along an outer periphery of the insulating tube. The insulating tube is equipped at its end portion with an end plate joining portion that projects from a base end portion of the projection portion inwardly in a radial direction of the insulating tube. The end plate joining portion is equipped on its surface with a metallized layer to which the fixed-side or movable-side end plate is joined by brazing.

4 Claims, 4 Drawing Sheets

(58) Field of Classification Search
CPC .......... H01H 2033/66215; H01H 2033/66276; H01H 2033/66284; H01H 2033/6623
USPC .......................... 218/139, 134, 138, 155, 118
See application file for complete search history.

(56) References Cited

U.S. PATENT DOCUMENTS

| | | | | |
|---|---|---|---|---|
| 7,820,934 | B2 * | 10/2010 | Cardoletti ........ | H01H 33/66261 218/123 |
| 8,178,812 | B2 * | 5/2012 | Martin ............. | H01H 33/66207 218/139 |
| 8,933,357 | B2 * | 1/2015 | Kim ................. | H01H 33/66261 218/147 |
| 9,875,869 | B2 * | 1/2018 | Campbell ........ | H01H 33/66207 |
| 10,074,496 | B2 * | 9/2018 | Lamara ............ | H01H 33/66207 |
| 10,134,546 | B2 * | 11/2018 | Li ...................... | H01H 33/6606 |
| 2011/0278262 | A1 * | 11/2011 | Ryu ................. | H01H 33/66261 218/139 |
| 2016/0045969 | A1 * | 2/2016 | Graskowski ....... | B23K 35/3006 228/248.1 |

* cited by examiner

VACUUM INTERRUPTER

TECHNICAL FIELD

The present invention relates to a vacuum interrupter. In particular, it relates to a structure of an insulating tube constituting the vacuum interrupter or a structure of an inside structural component of the vacuum interrupter.

BACKGROUND ART

A vacuum interrupter is configured to have a fixed electrode and a movable electrode in a vacuum container (e.g., Patent Publications 1 and 2).

The vacuum container is equipped with an insulating tube formed of ceramic material or the like, and a fixed-side end plate and a movable-side end plate that are provided at end portions of the insulating tube. The insulating tube is formed on its end surface with a metallized layer. To this metallized layer, the fixed-side end plate or the movable-side end plate is joined by brazing.

The metallized layer is extremely thin in thickness. Thus, in case that a high voltage has been applied to the vacuum interrupter, the electric field becomes higher as compared with other sites, thereby causing a risk that creeping flash-over occurs at an outside of the insulating tube from this site as the starting point. That is, there is a risk that withstand voltage performance lowers at a joint portion between the insulating tube and the fixed-side end plate (or the movable-side end plate).

Thus, in FIG. 4 of Patent Publication 1, the insulating tube is provided at its end portion with a projection portion that projects in the axial direction of the insulating tube, and is formed with a U-shaped groove portion at a base end portion of the projection portion on an end surface of the insulating tube. By providing such projection portion, an end portion of the metallized layer on an outer peripheral side of the insulating tube is not exposed to the surroundings of the vacuum interrupter, and electric field of an end portion of the metallized layer on the outer peripheral side of the insulating tube is relaxed. Electric field of the end portion of the metallized layer on the outer peripheral side of the insulating tube is also relaxed by forming the U-shaped groove at the base end portion of the projection portion on the end surface of the insulating tube.

However, in the case of forming a groove on an end surface of the insulating tube, the working process for manufacturing the insulating tube may become complicated, and a metal mold for manufacturing the insulating tube may become complicated. Furthermore, forming the groove may lower strength of the insulating tube.

PRIOR ART PUBLICATIONS

Patent Publications

Patent Publication 1: JP Patent Application Publication 2010-282923.

Patent Publication 2: JP Patent Application Publication 2017447026.

SUMMARY OF THE INVENTION

The present invention was made in view of the above-mentioned situation, and its object is to provide a technique to improve withstand voltage performance of the vacuum interrupter.

One aspect of a vacuum interrupter of the present invention to achieve the object, comprises:

- a vacuum container in which both end portions of a cylindrical insulating tube are hermetically sealed by end plates;
- a pair of electrodes provided in the vacuum container such that the pair of electrodes is capable of making a separation from each other and a contact with each other;
- a projection portion that projects from the end portion of the insulating tube in an axial direction of the insulating tube, the projection portion being formed along an outer periphery of the insulating tube;
- an end plate joining portion that is provided to project from a base end portion of the projection portion in an inner peripheral direction of the insulating tube; and
- a metallized layer provided at a surface of the end plate joining portion, the end plate being joined to the metallized layer.

Furthermore, according to another aspect of a vacuum interrupter of the present invention to achieve the object, in the above vacuum interrupter, the metallized layer comprises a joining portion that extends in a radial direction of the insulating tube, the end plate being joined to the joining portion, and an extension portion that extends in an axial direction of the insulating tube from an end portion of the joining portion on an inner peripheral side of the insulating tube.

Furthermore, according to another aspect of a vacuum interrupter of the present invention to achieve the object, in the above vacuum interrupter, an electric field relaxation shield is provided on an electrode shaft supporting the electrode in the insulating tube or on an inside of the insulating tube of the end plate,

- wherein the electric field relaxation shield is opposed to at least an end portion of the metallized layer in a radial direction of the insulating tube.

Furthermore, according to another aspect of a vacuum interrupter of the present invention to achieve the object, in the above vacuum interrupter, a connecting portion that smoothly connects an inner peripheral surface of the projection portion with a joining surface of the end plate joining portion is provided between the inner peripheral surface of the projection portion and the joining surface of the end plate joining portion, the end plate being joined to the joining surface, and

- wherein the metallized layer is provided to extend along the connecting portion from the joining surface of the end plate joining portion toward the inner peripheral surface of the projection portion.

BRIEF DESCRIPTION OF THE DRAWINGS

FIG. 3(*b*) is a view showing an electric field analysis portion of a vacuum interrupter according to another embodiment of the present invention.

MODE FOR IMPLEMENTING THE INVENTION

Figure 1:
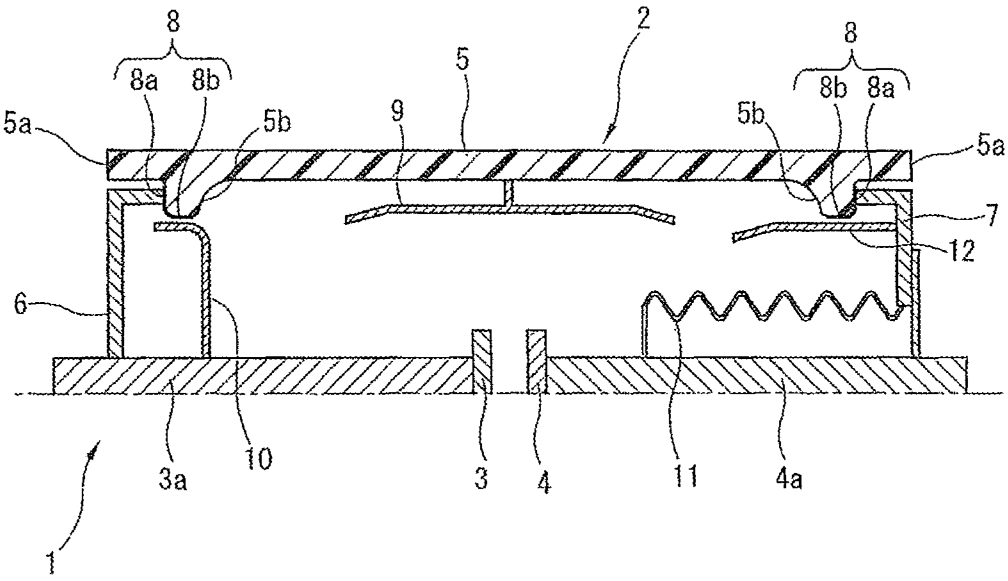
FIG. 1 is a sectional view of a major part of a vacuum interrupter according to an embodiment of the present invention.

A vacuum interrupter according to an embodiment of the present invention is explained in detail with reference to the drawings. The drawings shown in FIG. 1 to FIG. 4 are views schematically showing a vacuum interrupter according to an embodiment of the present invention. The dimensions shown in the drawings do not necessarily correspond to the actual dimensions.

As shown in FIG. 1, a vacuum interrupter 1 according to an embodiment of the present invention is equipped with a vacuum container 2, and a fixed electrode 3 and a movable electrode 4 that are provided in the vacuum container 2.

The vacuum container 2 is equipped with a cylindrical insulating tube 5 formed of ceramic material or the like, and a fixed-side end plate 6 and a movable-side end plate 7 that are respectively provided at end portions of the insulating tube 5. The fixed-side end plate 6 is hermetically joined to one end portion of the insulating tube 5, and the movable-side end plate 7 is hermetically joined to the other end portion of the insulating tube 5. In this manner, the inside of the vacuum container 2 is sealed by the fixed-side end plate 6 and the movable-side end plate 7 to have vacuum.

An end portion of the insulating tube 5 is equipped with a projection portion 5*a* along an outer periphery of the insulating tube 5 to project in the axial direction of the insulating tube 5. An end plate joining portion 5*b* is provided on an inner peripheral side of a base end portion of the projection portion 5*a*. To the end plate joining portion 5*b*, the fixed-side end plate 6 (or the movable-side end plate 7) is joined. The radial thickness of the insulating tube 5 is formed to become thick, for example, at a projection portion of the end plate joining portion 5*b*, and then gradually become the same thickness as that of a center portion of the insulating tube 5 from an end portion of the end plate joining portion 5*b* on an inner side of the insulating tube 5. It suffices to provide the end plate joining portion 5*b* to project from an inner wall of the insulating tube 5 toward the radially inner side of the insulating tube 5. Thus, for example, it is also possible to have a mode in which the end plate joining portion 5*b* is made to project such that not only a surface of the end plate joining portion 5*b* on an end side of the insulating tube 5, but also a surface on an inner side of the insulating tube 5 become parallel with the radial direction of the insulating tube 5. The projection portion 5*a* and the end plate joining portion 5*b* are monolithically formed with the insulating tube 5. The end plate joining portion 5*b* is equipped with a metallized layer 8 to which the fixed-side end plate 6 (or the movable-side end plate 7) is joined by brazing or the like. As a brazing material for joining the fixed-side end plate 6 (or the movable-side end plate 7) by brazing, a silver-based composite material is mainly used.

Figure 2:
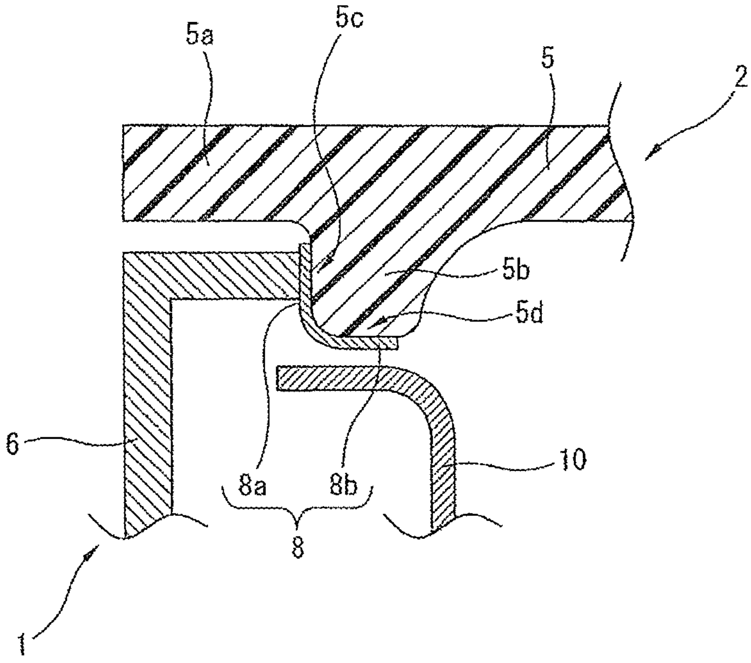
FIG. 2 is an enlarged sectional view of a fixed-side end plate joining portion of a vacuum interrupter according to an embodiment of the present invention.

As shown in FIG. 2, the end plate joining portion 5*b* is provided to project from a base end portion of the projection portion 5*a* toward an inner side in the radial direction of the insulating tube 5. The end plate joining portion 5*b* is equipped with a joining surface 5*c* to which the fixed-side end plate 6 is joined, and an inner peripheral surface 5*d* that extends in the axial direction of the insulating tube 5 from a projection end of the joining surface 5*c*. The joining surface 5*c* of the end plate joining portion 5*b* is a surface extending from a base end portion of the projection portion 5*a* toward an inner side in the radial direction of the insulating tube 5, and is formed along an inner periphery of the insulating tube 5. The inner peripheral surface 5*d* of the end plate joining portion 5*b* is an end surface projecting toward an inner side in the radial direction of the insulating tube 5 of the end plate joining portion 5*b*, and is a surface forming a part of an inner peripheral surface of the insulating tube 5. The projection portion 5*a* and/or the end plate joining portion 5*b* and the metallized layer 8 at an end portion of the insulating tube 5 where the movable-side end plate 7 is provided are the same in shape as the projection portion 5*a* and/or the end plate joining portion 5*b* and the metallized layer 8 at an end portion of the insulating tube 5 where the fixed-side end plate 6 is provided. Therefore, similar structures are denoted by the same signs, and their detailed explanations are omitted.

The metallized layer 8 is equipped with a joining portion 8*a* provided on the joining surface 5*c* of the end plate joining portion 5*b*, and an extension portion 8*b* provided on the inner peripheral surface 5*d* of the end plate joining portion 5*b*. That is, the metallized layer 8 is equipped with the joining portion 8*a* extending in the radial direction of the insulating tube 5, and the extension portion 8*b* extending in the axial direction of the insulating tube 5 from an end portion on an inner peripheral side of the insulating tube 5 of the joining portion 8*a*. The joining portion 8*a* and the extension portion 8*b* are formed into one piece.

As shown in FIG. 1, the fixed electrode 3 and the movable electrode 4 are disposed in the vacuum container 2 such that they are opposed to each other. To the fixed electrode 3, a fixed electrode rod 3*a* is joined by brazing. Furthermore, to the movable electrode 4, a movable electrode rod 4*a* is joined by brazing. Furthermore, an intermediate shield 9 is provided in the inside of the vacuum container 2 to cover the fixed electrode 3 and the movable electrode 4, thereby preventing contamination of an inner surface of the vacuum container 2 with a metal vapor that is generated by an arc between the fixed electrode 3 and the movable electrode 4.

The fixed electrode rod 3*a* is an electrode shaft that supports the fixed electrode 3 in the insulating tube 5, and is provided to pass through the fixed-side end plate 6. The fixed electrode rod 3*a* is provided with an electric field relaxation shield 10. The electric field relaxation shield 10 is provided to be opposed to the metallized layer 8 (i.e., the extension portion 8*b* of the metallized layer 8) formed on a projecting end surface of the end plate joining portion 5*b*.

The movable electrode rod 4*a* is an electrode shaft that supports the movable electrode 4 in the insulating tube 5, and is provided to pass through the movable-side end plate 7. The movable electrode rod 4*a* is moved in the axial direction by an outside operation mechanism not shown in the drawings. By moving the movable electrode rod 4*a* in the axial direction, the fixed electrode 3 and the movable electrode 4 are brought into contact or separated, thereby conducting a switching action (supply and shutdown) of the vacuum interrupter 1. A bellows 11 is provided between the movable-side end plate 7 and the movable electrode rod 4*a* to cover an outer periphery of the movable electrode rod 4*a*.

The bellows 11 is made into a serpentine shape with a thin stainless steel, and makes it possible to move the movable electrode rod 4*a* in the axial direction while keeping vacuum sealing of the inside of the vacuum container 2. Although not shown in the drawings, the bellows 11 is provided at its end portion on the side of the movable electrode 4 with a bellows shield. This bellows shield prevents contamination of the bellows 11 with a metal vapor that is generated by an arc between the fixed electrode 3 and the movable electrode 4.

The fixed-side end plate 6 is formed into a deep pan shape, and a flange end portion of this deep pan shape is joined by brazing to the metallized layer 8 (specifically, the joining portion 8*a* of the metallized layer 8) provided at the end plate joining portion 5*b*. The fixed-side end plate 6 is formed with a hole through which the fixed electrode rod 3*a* passes.

The movable-side end plate 7 is formed into a deep pan shape, and a flange end portion of this deep pan shape is joined by brazing to the metallized layer 8 (specifically, the joining portion 8*a* of the metallized layer 8) provided at the end plate joining portion 5*b*. The movable-side end plate 7 is formed with a hole through which the movable electrode rod 4*a* passes. Furthermore, the movable-side end plate 7 is provided with an electric field relaxation shield 12. The electric field relaxation shield 12 extends in the vacuum container 2 to be opposed to the metallized layer 8 (i.e., the extension portion 8*b* of the metallized layer) formed on a projecting end surface of the end plate joining portion 5*b*, and a tip portion of the electric field relaxation shield 12 is bent toward the inner side of the vacuum container 2.

Next, electric field analysis of the vacuum interrupter 1 according to an embodiment of the present invention was conducted. Electric field analysis was conducted by using an electric field analysis software ElecNet (made by Infolytica Co.). Electric field analysis was conducted by assuming an imaginary ground surface, which is parallel with the center axis (axis of the fixed electrode rod 3*a* and the movable electrode rod 4*a*) of the vacuum interrupter 1, at a position away from the insulating tube 5 of the vacuum interrupter 1.

Figure 3:
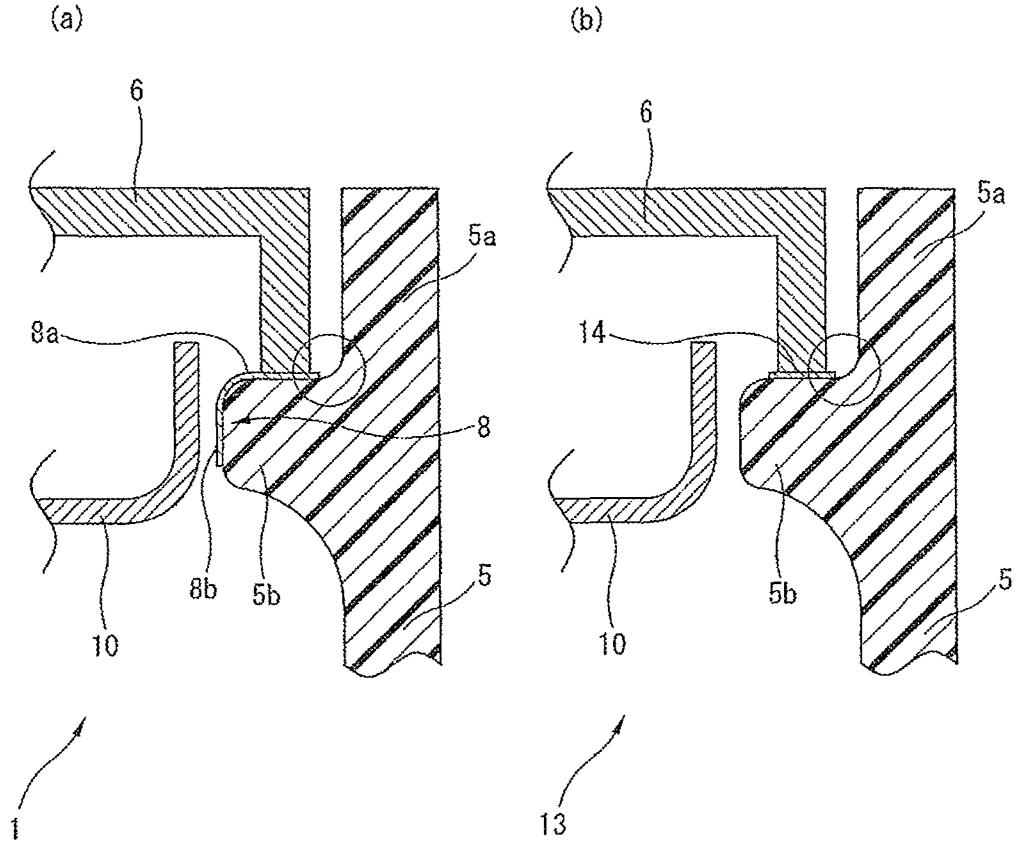
FIG. 3(*a*) is a view showing an electric field analysis portion of a vacuum interrupter according to an embodiment of the present invention.

As shown in FIG. 3(*a*), as electric field analysis of an end portion (a part surrounded by a circle in the drawing) of the metallized layer 8 on an outer peripheral side of the insulating tube 5 was conducted, the electric field value was 7.56%/mm. The electric field value (%/mm) indicates the proportion of electric potential difference change per 1 mm, assuming that the voltage (V) applied between the electrodes of the vacuum interrupter 1 is 100%.

Furthermore, as another embodiment of the vacuum interrupter 1 of the present invention, an electric field analysis similar to the vacuum interrupter 1 was conducted on a metallized layer 14 of a vacuum interrupter 13 shown in FIG. 3(*b*). As an electric field analysis of an end portion (a part surrounded by a circle in the drawing) of the metallized layer 14 on an outer peripheral side of the insulating tube 5 was conducted, the electric field value was 8.28%/mm. The vacuum interrupter 13 is similar to the vacuum interrupter 1 in structure, except in that the metallized layer 14 is not equipped with an extension portion (corresponding to the extension portion 8*b* of the vacuum interrupter 1) extending in the axial direction of the insulating tube 5. Therefore, structures similar to those of the vacuum interrupter 1 are denoted by the same signs, and their detailed explanations are omitted.

From these two analysis results, it is understood that the vacuum interrupter 1 is lower than the vacuum interrupter 13 in electric field value by about 10% by providing the end plate joining portion 5*b* to project inwardly in the radial direction of the insulating tube 5 and by forming on the end plate joining portion 5*b* the metallized layer 8 having the extension portion 8*b*.

By forming the end plate joining portion 5*b* to project from an inner peripheral surface of the insulating tube 5 in the radial direction of the insulating tube 5, the vacuum interrupter 13 is capable of improving withstand voltage performance of the vacuum interrupter 13 without changing diameter of the vacuum interrupter 13.

According to the above-mentioned vacuum interrupter 1, 13 according to an embodiment of the present invention, the end plate joining portion 5*b*, to which the fixed-side end plate 6 (or the movable-side end plate 7) is joined, is provided to project inwardly in the radial direction of the insulating tube 5, and the fixed-side end plate 6 (or the movable-side end plate 7) having a diameter smaller than outer diameter of the vacuum container 2 is provided on the end plate joining portion 5*b*. With this, it is possible to improve withstand voltage performance of the vacuum interrupter 1, 13 without changing inner diameter and outer shape of the vacuum container 2.

By providing the projection portion 5*a* on an end portion of the insulating tube 5 to project in the axial direction of the insulating tube 5, it is possible to conceal the end portion of the metallized layer 8 on the outer peripheral side of the insulating tube 5 from an outer peripheral portion of the vacuum container 2, thereby making external flashover difficult to occur by barrier effect and improving withstand voltage performance of the vacuum interrupter 1, 13.

In the case of providing the projection portion 5*a* at an end portion of the insulating tube 5, it is necessary to enlarge outer shape of the insulating tube 5 by the thickness of the projection portion 5*a*. In case that the projection portion 5*a* is thin in thickness, the projection portion 5*a* tends to be broken. And so, in the vacuum interrupter 1, 13 according to an embodiment of the present invention, the end plate joining portion 5*b* is provided to project inwardly in the radial direction of the insulating tube 5. With this, it is possible to improve withstand voltage performance of the vacuum interrupter 1 without changing inner diameter and outer shape of the vacuum container 2. That is, the thickness at the end plate joining portion 5*b* of the insulating tube 5 is made thicker than the thickness of other parts of the insulating tube 5. With this, it is possible to improve withstand voltage performance of the vacuum interrupter 1, 13 without changing inner diameter and outer shape of the vacuum container 2. Furthermore, irrespective of inner diameter and outer shape, it is possible to select thickness of the projection portion 5*a*. Therefore, it is possible to improve strength of the projection portion 5*a* without changing inner diameter and outer shape of the vacuum container 2.

Furthermore, it is possible by extending the range of the metallized layer 8 to relax electric field of an end portion of the metallized layer 8 on an outer peripheral side of the insulating tube 5 and to improve withstand voltage performance of the vacuum interrupter 1.

By extending the metallized layer 8 to a range opposing the electric field relaxation shield 10 (or the electric field relaxation shield 12), it is possible to lower the electric field value of an end portion of the metallized layer 8 on an outer peripheral side of the insulating tube 5. However, the electric field value of an end portion of the metallized layer 8 on an inner peripheral side of the insulating tube 5 increases. Thus, the electric field relaxation shield 10 (or the electric field relaxation shield 12) is provided to be opposed to the extension portion 8*b* of the metallized layer 8. With this, it is possible to relax electric field at an end portion of the metallized layer 8 on an inner peripheral side of the insulating tube 5. By providing the electric field relaxation shield 10 (or the electric field relaxation shield 12) to cover at least an end portion of the extension portion 8*b* (to be opposed to the end portion of the extension portion 8*b* in the radial direction of the insulating tube 5) that extends from the joining portion 8*a* in the axial direction of the insulating tube 5, it is possible to suppress lowering of withstand voltage performance at the end portion of the extension portion 8*b* at which electric field concentrates.

That is, the formation range of the metallized layer 8 is extended to form the extension portion 8*b* extended in the axial direction of the insulating tube 5, and the electric field relaxation shield 10 (or the electric relaxation shield 12) is provided to be opposed to the extension portion 8*b* of this metallized layer 8. With this, it is possible to relax electric field at an end portion of the metallized layer 8 on an inner peripheral side of the vacuum container 2. Furthermore, the projection portion 5*a* is formed on the insulating tube 5, and the formation range of the metallized layer 8 is extended (that is, the metallized layer 8 is provided with the extension portion 8*b*). With this, it is possible to relax electric field at an end portion of the metallized layer 8 on an outer peripheral side of the vacuum container 2.

As above, the vacuum interrupter of the present invention was explained by showing specific embodiments. The vacuum interrupter of the present invention is, however, not limited to the embodiments. It is possible to suitably modify the design to the extent that its feature is not damaged. The modified design also belongs to the technical scope of the present invention.

A vacuum interrupter partly having the feature of the vacuum interrupter 1 explained in the embodiment also belongs to the technical scope of the present invention. For example, vacuum interrupters separately having the shape of the projection portion 5*a* or the end plate joining portion 5*b* of the insulating tube 5 or the shape of the metallized layer 8 are capable of separately obtaining the effects obtained by respective structures.

Figure 4:
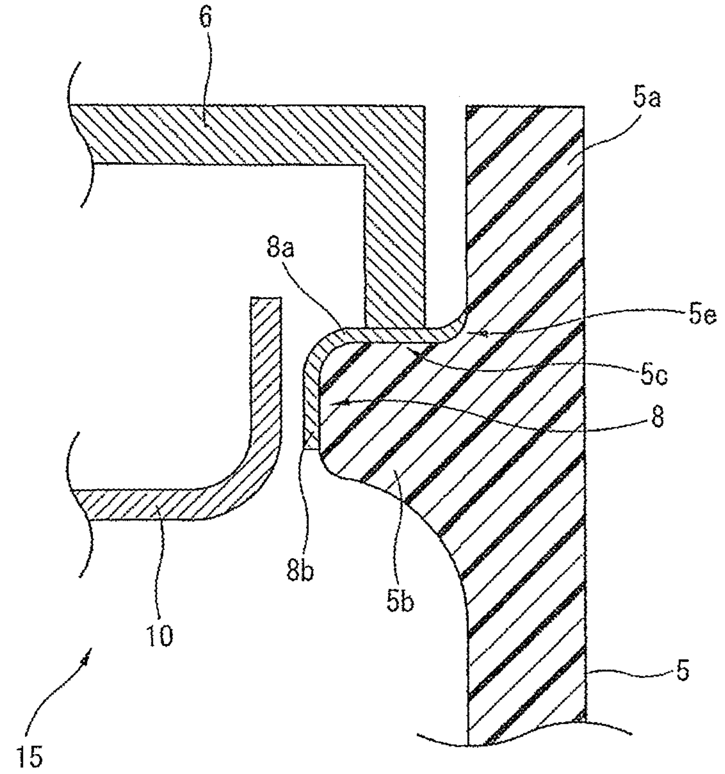
FIG. 4 is an enlarged sectional view of a fixed-side end plate joining portion of a vacuum interrupter according to another embodiment of the present invention.

Furthermore, as shown in FIG. 4, it is also possible to provide a mode in which a connection portion 5*e* for smoothly connecting an inner peripheral surface of the projection portion 5*a* and the joining surface 5*c* of the end plate joining portion 5*b* is provided between the inner peripheral surface of the projection portion 5*a* and the joining surface 5*c* of the end plate joining portion 5*b*, and in which the metallized layer 8 is provided along the curved surface of this connecting portion 5*e* to extend from the joining surface 5*c* toward the direction of the inner peripheral surface of the projection portion 5*a*. In this manner, as the metallized layer 8 is applied along the curved surface of the connecting portion 5*e*, it is possible to prevent a local strengthening of electric field at an end portion of the metallized layer 8 on an outer peripheral side of the insulating container 2, thereby further improving withstand voltage performance of the vacuum interrupter 15.

Furthermore, in connection with the shape of the projection portion 5*a* and the end plate joining portion 5*b*, it is possible to provide not only a mode that they are formed on both ends of the insulating tube 5, but also a mode that they are formed on one of the end portions of the insulating tube 5 on which the fixed-side end plate 6 or the movable-side end plate 7 is provided.

Furthermore, the shape of the fixed-side end plate 6 or the movable-side end plate 7 is not limited to a deep pan shape, as long as it is capable of hermetically sealing one end of the insulating tube 5. For example, it may be a plate-like shape.

Furthermore, it is also possible to provide the electric field relaxation shield 10 on an inner side of the insulating tube 5 of the fixed-side end plate 6.

The invention claimed is:

1. A vacuum interrupter, comprising:

a vacuum container in which both end portions of a cylindrical insulating tube are hermetically sealed by end plates;

a pair of electrodes provided in the vacuum container such that the pair of electrodes is capable of making separation from each other and contact with each other;

a projection portion that projects from the end portion of the insulating tube in an axial direction of the insulating tube, the projection portion being formed along an outer periphery of the insulating tube;

an end plate joining portion that is provided to project from a base end portion of the projection portion inwardly in a radial direction of the insulating tube such that a radial thickness at the end plate joining portion of the insulating tube is thicker than a radial thickness of other parts of the insulating tube; and a metallized layer provided at a surface of the end plate joining portion, the end plate being joined to the metallized layer.

2. The vacuum interrupter as claimed in claim 1, wherein an electric field relaxation shield is provided on an electrode shaft supporting the electrode in the insulating tube or on an inside of the insulating tube of the end plate, wherein the electric field relaxation shield is opposed to at least an end portion of the metallized layer in a radial direction of the insulating tube.

3. The vacuum interrupter as claimed in claim 1, wherein a connecting portion that smoothly connects an inner peripheral surface of the projection portion with a joining surface of the end plate joining portion is provided between the inner peripheral surface of the projection portion and the joining surface of the end plate joining portion, the end plate being joined to the joining surface, and wherein the metallized layer is provided to extend along the connecting portion from the joining surface of the end plate joining portion toward the inner peripheral surface of the projection portion.

4. A vacuum interrupter, comprising:

a vacuum container in which both end portions of a cylindrical insulating tube are hermetically sealed by end plates;

a pair of electrodes provided in the vacuum container such that the pair of electrodes is capable of making separation from each other and contact with each other;

a projection portion that projects from the end portion of the insulating tube in an axial direction of the insulating tube, the projection portion being formed along an outer periphery of the insulating tube;

an end plate joining portion that is provided to project from a base end portion of the projection portion inwardly in a radial direction of the insulating tube such that a radial thickness at the end plate joining portion of the insulating tube is thicker than a radial thickness of other parts of the insulating tube; and a metallized layer provided at a surface of the end plate joining portion, the end plate being joined to the metallized layer, wherein the metallized layer comprises a joining portion that extends in a radial direction of the insulating tube, the end plate being joined to the joining portion, and an extension portion that extends in an axial direction of the insulating tube from an end portion of the joining portion on an inner peripheral side of the insulating tube.

* * * * *